Patented July 23, 1929.

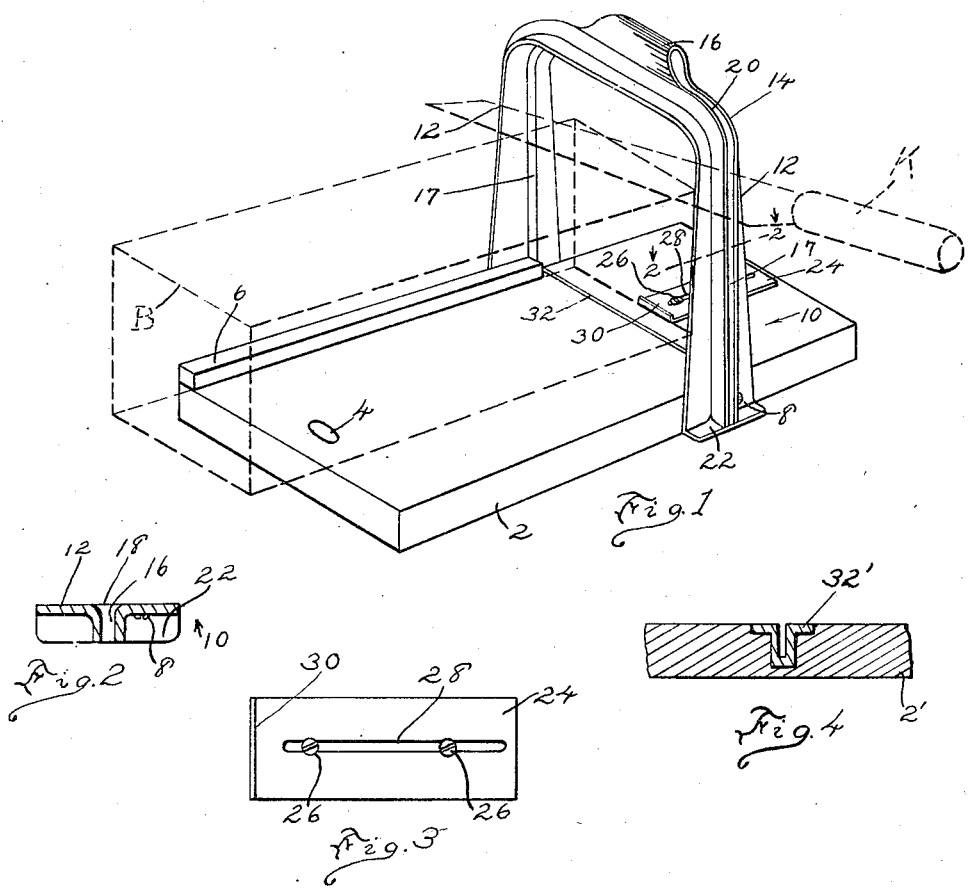

1,721,937

UNITED STATES PATENT OFFICE.

THOMAS C. WILLIAMS, OF EAST BAKERSFIELD, CALIFORNIA.

FOOD CUTTER.

Application filed April 11, 1927. Serial No. 182,606.

My invention relates to devices for cutting food, such as bread, meats or sausages and the like so that said food may be cut of even thickness, said invention serving to take the place of the expensive motor and hand operated devices now on the market.

An object of my invention is to provide a novel form of food cutter comprising a base equipped with a stop for preventing movement of the food as it is being cut, which base has associated therewith a means whereby the depth of cut may be varied, and also a knife guiding means for insuring that the food will be cut in even slices of the same thickness, said means being also provided with a means whereby the introduction of the knife therein may be facilitated.

It is also within the province of my invention to provide a means whereby the cutter may be collapsed so that it may be suspended, or occupy a small space when not in use, and also to provide a reinforcing means in the base thereof so that the knife cuts will not wear through the base of the cutter.

The above and further objects and advantages of my invention, as will hereinafter more fully appear, I attain by the construction described in the specification and illustrated in the drawings forming my application.

Reference is had to the accompanying drawings, in which similar reference characters denote similar parts. In the drawings, Fig. 1, is a perspective view of my invention showing in dotted lines the manner in which the food is cut, Fig. 2 is a transverse cross-sectional view on the line 2—2, Fig. 1, looking in the direction of the arrows, Fig. 3 is a somewhat enlarged plan view of the device for adjusting the thickness of the cut of the food, and Fig. 4 is a fragmentary cross-sectional view of an insert adapted to be used with my invention.

Describing my invention more in detail, the device is intended as a substitute for the very expensive mechanisms in common use for cutting food of even thicknesses, the cost of manufacturing of which is but a fraction of that of said devices.

As seen in the drawings, I provide a base 2, preferably of wood or other suitable material, which base is equipped with a means whereby the device may be suspended, as by the hole 4, a projection or stop 6 on the base 2 affording a means for preventing any movement of the food while it is being cut, said food being bread, meats or sausages as in practice may be suggested.

Positioned at a suitable place between the ends of the base 2, and preferably pivoted thereto by suitable pivots 8 is a knife guiding means, designated generally by the numeral 10. Said guiding means is preferably constructed of metal, and may be cast, pressed or produced in any manner in practice desired.

The knife guiding means 10 consists of two uprights 12, preferably tapered as shown, and said uprights are connected together at the top by a cross piece 14, equipped with a loop or other knife guiding means 16 to facilitate the introduction of the knife in said guiding means, the uprights 12 being provided with a slot 17, flared as shown at 18, to insure that the knife will enter said slots, the cross piece 14 being also provided with a slot 20 for a similar purpose, said slots, as shown, being continuous, and provide for a ready insertion and operation of the knife. The lower end of each of the uprights 12 is provided with a flange 22 for anchoring said uprights in position so that they will not move when the food is being cut. When not in use the device may be collapsed by swinging the guiding means 10 toward either end by means of the pivots 8, which may be an ordinary screw.

To provide a means for adjusting the depth of the cut, I position a slotted plate 24 on the base 2 in close proximity with the guiding means 10, as shown, an adjusting means in the shape of a pair of screws 26, positioned in the slot 28, serving as a means for moving the plate 24 toward or away from the guiding means 10, a flange 30 on said plate serving as a stop for the food.

If desired, a slot 32 may be provided in the base 2 for receiving the knife after the slice of food has been cut, and this slot may be reinforced by an insert 32′ in the base 2′, as depicted in the slight modification shown in Fig. 4.

In use, the food such as the bread B, shown in dotted lines, Fig. 1, is positioned on the base 2, and against the stop 6, as well as against the flange 30 on the plate 24, which has been adjusted by means of the screws 26 for the cut desired. The knife K is then inserted in the loop 16 and the bread or other food cut, said bread being pushed toward the flange 30 after each cut has been made.

By the use of my invention it is possible to cut even slices of all foods, very thin or thick, as desired, and without any wastage.

While I have thus described my invention with great particularity, it will be clear that the same may be modified throughout a wide range. I accordingly do not propose to be limited to the exact details of construction shown and described, but reserve the right in practice to make any and all modifications thereof that fall within the scope of the appended claim.

I claim as my invention:

In a food cutter, in combination, a base, a knife-guiding member pivoted to said base, said member comprising a pair of uprights and a cross-bar connecting said uprights, a pair of slot defining flanges extending the length of said uprights and said cross-bar, and a loop on said cross-bar connecting said flanges, said loop functioning to receive the point of a knife so that it may be quickly inserted in said slot.

In testimony whereof I have signed my name to this specification.

THOMAS C. WILLIAMS.